Sept. 11, 1962 R. A. WEEKS 3,053,944

HEADSET MOUNTING BRACKET

Filed Jan. 6, 1960

INVENTOR
RICHARD A. WEEKS

BY Arnold J. Ericsen

ATTORNEY

United States Patent Office 3,053,944

Patented Sept. 11, 1962

3,053,944
HEADSET MOUNTING BRACKET

Richard A. Weeks, Brown Deer, Wis., assignor to Koss, Inc., Milwaukee, Wis., a corporation of Wisconsin Filed Jan. 6, 1960, Ser. No. 769
7 Claims. (Cl. 179—156)

Figures 1, 2, 3:
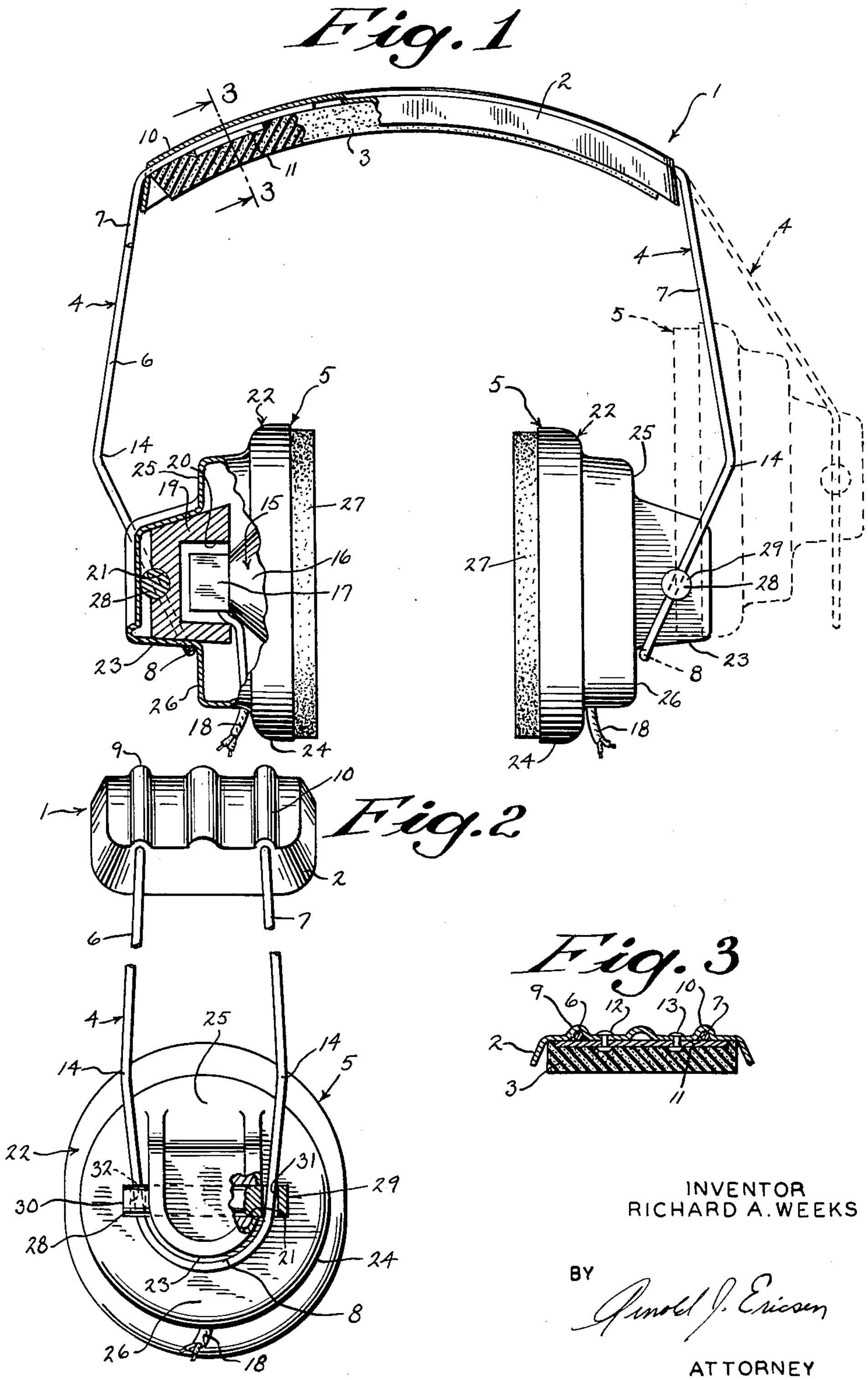

This invention relates to headsets; and it more particularly resides in a phone cup mounting bracket for use in a headset having a pair of rod-like support members depending from the headband of the headset; a bail portion connecting the lower ends of the rod or support members; and a phone cup slidably and pivotably supported by the support members.

Previously devised headsets have often employed mounting brackets terminating in a rigid forked member in clamping engagement with the phone cup, and have thereby been subject to several serious disadvantages. For example, brackets of such construction allow free, substantially complete pivotal rotation of the phone cup whereby the relatively heavier and more fragile front portion of the cup tends to assume a downwardly facing position wherein it may be damaged by dirt or breakage when the headset is placed on a table or other supporting surface. Although prior brackets allow for some degree of vertical adjustability of the phone cups, such vertical movement normally causes the phone cup to be pulled away from the head thereby allowing for interference from background sounds. Such mounting brackets also tend to become loose with wear, thus failing to hold the phone cup effectively to the wearer's ear, or, if provided with sufficient tension to so hold the phone cup, are uncomfortable to the wearer when used over long periods. In addition, such loosening is often sufficient to allow the phone cup to fall from the forked member and be thereby broken or damaged.

The above disadvantages have been amplified by the present trend toward the use in headsets of speakers of relatively large dimension, such as when the headset is to be used as a component of stereophonic equipment, such speakers being relatively more fragile and thus more subject to damage. In addition, it is especially necessary for the phone cups of stereophonic headsets to be held in a fully head conforming position in order to prevent background interference and enable distinguishment of binaural sound patterns. Attempts to increase the size of prior brackets in order to accommodate the relatively larger phone cups have resulted in ineffective and unsightly devices.

Accordingly it is an object of this invention to provide a phone cup mounting bracket arranged to lightly but effectively hold a phone cup in a head conforming position.

It is another object of this invention to provide a headset mounting bracket which gently urges a phone cup supported thereby toward a head conforming position regardless of the position of vertical adjustment of the phone cup.

It is a further object of this invention to provide a mounting bracket for a headset, including support means for a phone cup, wherein the phone cup is prevented from separating from the headset even after long use.

It is still another object of this invention to provide a headset wherein the tilt or rotation of a pivotally supported phone cup or cups is limited to prevent damage to the phone cup or cups when the headset is placed on a bench or table.

It is a still further object of this invention to provide a headset wherein the phone cups supported thereby are vertically adjustable and may be held in any desired position of vertical adjustment.

It is a still further object of this invention to provide a phone cup mounting bracket for use in a headset which bracket is easily adaptable for use with relatively large phone cup speakers.

It is a still further object of this invention to provide a phone cup mounting bracket for a headset incorporating the aforementioned properties and which is of a simple, effective construction pleasing to the eye.

These and other objects and advantages will appear from the description to follow. In the description, reference is made to the accompanying drawing which forms a part hereof and in which there is shown by way of illustration and not of limitation a preferred embodiment of this invention.

In the drawing:

FIG. 1 is a front view in elevation with parts broken away and in section of a headset embodying the present invention, with alternative positions of a phone cup also being shown, FIG. 2 is a side view in elevation with parts broken away and in section of the embodiment of FIG. 1, and FIG. 3 is a sectional view of a portion of the embodiment of FIG. 1 taken along the plane 3—3 thereof.

Referring now more particularly to the drawing, there is shown a headset generally designated by the reference character 1. The headset 1 is provided with a rectangular box-like headband 2 formed of a lightweight, relativly rigid plastic material, such as Royalite, and having a generally head conforming curved configuration. The downwardly facing interior surface of the headband 2 is defined by a cushion strip 3, preferably formed of a plastic foam, such as urethane, or any other suitable padding material. The cushion strip 3 extends downwardly of the headband 2, to thereby provide a padding to insure a comfortable fit of the headband on the wearer's head. Depending from each end of the headband 2, by means of mounting brackets 4, are relatively opposed phone cups 5.

The mounting brackets 4 are formed of brass or any suitable inherently resilient material, and have a generally U-shaped outline, comprising spaced apart rod-like support members 6 and 7 forming a slide for a respective phone cup 5 and an arcuate, integral connecting bail portion 8. Although the bail portion 8 in the embodiment shown is formed as an integral extension of the support members 6 and 7, it may be readily understood that any suitable stop means may be provided without departure from the invention.

The upper ends of the support members 6 and 7 are received in complementary spaced mounting channels 9 and 10 formed or impressed in the headband 2. A rectangular metal plate 11 may be soldered or connected in any other desired manner to the upper ends of the support members 6 and 7 and is secured by rivets 12 and 13 to the headband 2, whereby the support members are firmly attached to the headband. The support members 6 and 7 are also bent intermediate the ends thereof to provide angles 14, as seen in FIG. 1, intermediate the headband 2 and the bail portion 8. As seen in FIG. 2, the distance between the depending support members 6 and 7 at the apex of the angles 14 is preferably made greater than the distance therebetween at the point of connection with the headband 2 or at the bail portion 8.

Referring now more particularly to FIGS. 1 and 2, the phone cups 6 are of conventional manufacture including a speaker 15 having a cone portion 16 and a magnetic drive element 17 connected by a power input conductor 18 to the audio device in conjunction with which the headset is to be used. A generally trapezoidal mounting block 19, formed of wood, is provided with a recess 20 within which the magnetic drive element 17 is enclosed and protected. On its rear surface the mounting block 19 is provided with a substantially semi-circular groove 21. A lightweight protective housing 22, formed of Royalite or any suitable material, serves to enclose the speaker 15 and mounting block 19, and has thereby a relatively smaller mounting block housing 23 and a relatively larger speaker housing 24 having shoulders 25 and 26 engageable with rod members 6 and 7. On the front of the phone cups 5 there may be provided annular plastic foam rings 27 when desired to insure a comfortable and effective fit to the wearer's head.

A cylindrical pin 28, preferably formed of brass, is rotatably mounted through the mounting block housing 23 by means of the mounting block groove 21 and the interior rear side of the mounting block housing 23. The pin 28 extends outwardly on either side of the mounting block housing 23 thereby forming trunnions 29 and 30 provided with apertures 31 and 32 through which the rod members 6 and 7 may be slidably received.

The brackets 4 and the phone cups 5 normally occupy the solid line or rest position shown in FIG. 1. In order for the headset to be worn, however, the phone cups and brackets must be spread relatively apart and into the dotted line or wearing position shown therein, in which the spaced support members 6 and 7 retain a substantial tendency to return to their rest position. The inherent resilient force exerted thereby serves to tilt the phone cups 5 into a vertically head conforming position about the pin 28 while the support members 6 and 7 simultaneously exert independent twisting forces to urge the phone cups 5 into a horizontally head conforming position. This resilient force may be varied to suit the individual by bending the support members to an appropriate configuration. Due to their composition, such bending will not destroy the inherent resilience of the support members.

When the brackets 4 and the phone cups 5 are in the dotted line wearing position, the portions of the support members 6 and 7 between the angles 14 and the bail portion 8 occupy a substantially vertical position thereby allowing for vertical adjustment of the phone cups 5. Sliding movement of the phone cups 5 on the support members 6 and 7 is normally prevented, however, by the tight engagement of the members 6 and 7 within the trunnion openings 31 and 32 due to the relatively greater distance between the support members as opposed to the fixed distance between the trunnion apertures. Due to their resilient construction, members 6 and 7 may be forced into a parallel relationship wherein the distance therebetween equals the distance between the trunnion apertures 31 and 32, thus allowing the vertical sliding of the phone cup. At all positions of the phone cup, however, the support members are resiliently urged outwardly into a tight, slide preventing relationship with the trunnions 29 and 30. The spacing of the support members 6 and 7 may be varied initially or by subsequent bending to prevent the sliding of the phone cups due to their own weight, while allowing easy adjustment at the option of the wearer. It is obvious that the bail portion 8 will prevent the phone cup from falling from the bracket at any time.

Again referring to FIG. 1, it can be seen that the tilting of the phone cups is limited by the support members 6 and 7 and the connecting bail portion 8. As the phone cups are tilted in either direction, the support members or the bail portion 8 come into striking engagement with the speaker housing shoulders 25 and 26 whereby the tilting motion is limited, for example, to the solid line positions of the phone cups 5 in FIG. 1. It can be readily seen that other suitable abutments may be provided to perform the tilt limiting function of the shoulders 25 and 26.

One embodiment of an improved phone cup mounting bracket has been shown herein. It is desired that it be understood, however, that the invention is not to be limited to any particular form or arrangement of parts except insofar as such limitations are included in the following claims.

I claim:

1. In a headset the combination comprising: a headband; a bracket depending from an end of the headband; stop means carried by the bracket at the end thereof remote from the headband; and a phone cup having a pair of trunnion means on opposite sides thereof that are slidably and pivotably associated with the bracket intermediate the headband and the stop means.

2. In a headset the combination comprising: a headband; a bracket having a pair of spaced, substantially parallel support members depending from an end of said headband, and including a connecting bail portion between the lower ends of the support members; and a phone cup having a pair of pivotably mounted, apertured trunnion members on opposite sides thereof, said support members slidably passing through the apertures of respective trunnion members whereby the phone cup is slidably and pivotably supported intermediate the headband and the bail portion.

3. In a headset the combination comprising: a headband; a bracket having a pair of spaced substantially parallel support members depending from an end of the headband and including a connecting bail portion between the lower ends of the support members; and a phone cup having a pivotably mounted pin extending therethrough and extending outwardly on both sides thereof to form a pair of trunnion members, each of said trunnion members being provided with an aperture through which a respective support member is slidably received whereby the phone cup is slidably and pivotably supported intermediate the headband and the bail portion, said phone cup being provided with abutments thereon arranged for striking engagement with the support members to thereby limit the pivotal motion of the phone cup.

4. In a headset the combination comprising: a headband; a bracket having a pair of spaced substantially parallel support members depending from an end of the headband and including a connecting bail portion between the lower ends of the support members; a phone cup having a pair of pivotable apertured trunnion members on opposite sides thereof, each of said support members being slidably received through the aperture of a respective trunnion member whereby the phone cup is slidably and pivotably supported intermediate the headband and the bail portion; and resilient means arranged for urging the trunnion members and the support members into tight relative engagement to thereby retard the sliding of the phone cup.

5. In a headset the combination comprising: a headband; a resilient bracket having a pair of spaced substantially parallel resilient support members depending from an end of the headband and including a connecting bail portion between the lower ends of the support members; and a phone cup having a pivotably mounted pin extending therethrough and extending outwardly on either side thereof to form a pair of trunnion members, each of said trunnion members being provided with an aperture through which a respective support member is slidably received whereby the phone cup is slidably and pivotably supported intermediate the headband and the bail portion, said bracket being arranged to resiliently urge the phone cup into a head conforming position, said support members being normally spaced apart a distance different than the distance between the apertures of the trunnion members whereby the support members and the trunnion members are urged into tight relative engagement to thereby prevent the sliding of the phone cup.

6. In a headset the combination comprising: a headband; a phone cup having a speaker housing portion and a mounting block on the rear thereof; trunnion means mounted on and extending outwardly from opposite sides of said mounting block; a pair of spaced substantially parallel support members depending from an end of the headband and a connecting bail portion between the lower ends of the support members, said support members being arranged for slidable and pivotable engagement with the trunnion means, whereby the phone cup will be pivotably and slidably mounted thereon, said support members being engageable with the speaker housing portion to limit the pivotal movement of the phone cup.

7. In a headset the combination comprising: a headband; a phone cup having a speaker housing portion and a mounting block on the rear thereof; a pair of apertured trunnions pivotably mounted on and extending outwardly from opposite sides of said mounting block; a resilient bracket having a pair of spaced substantially parallel support members depending from an end of the headband and a connecting bail portion between the lower ends of the support members, said support members being slidably received by the apertured trunnions at said opposite sides of said mounting block, whereby the phone cup will be pivotably and slidably mounted thereon, said support members being engageable with the speaker housing portion to limit the pivotal motion of the phone cup, said bracket being further arranged to urge the phone cup towards a head conforming position; and resilient means arranged to urge the phone cup and the support members into tight relative engagement to prevent the sliding of the phone cup.

References Cited in the file of this patent

UNITED STATES PATENTS

| | | |
|---|---|---|
| 1,560,718 | Nowosielski | Nov. 10, 1925 |
| 2,149,341 | Harrison | Mar. 7, 1939 |
| 2,924,672 | Cagen | Feb. 9, 1960 |